US009156210B2

(12) United States Patent
Gibson et al.

(10) Patent No.: US 9,156,210 B2
(45) Date of Patent: *Oct. 13, 2015

(54) HOLLOW, COMPOSITE-MATERIAL REBAR FABRICATION APPARATUS

(71) Applicant: Composite Rebar Technologies, Inc., Salem, OR (US)

(72) Inventors: Robert C. Gibson, Madison, WI (US); Thomas S. Ohnstad, Salem, OR (US); Matthew H. Noble, Lebanon, OR (US); Trent J. Garber, Albany, OR (US); Thomas A. Hershberger, Madison, WI (US)

(73) Assignee: Composite Rebar Technologies, Inc., Salem, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/447,513

(22) Filed: Jul. 30, 2014

(65) Prior Publication Data
US 2014/0335217 A1 Nov. 13, 2014

Related U.S. Application Data

(62) Division of application No. 13/215,199, filed on Aug. 22, 2011.

(60) Provisional application No. 61/385,502, filed on Sep. 22, 2010.

(51) Int. Cl.
*B29C 70/74* (2006.01)
*B29C 70/52* (2006.01)
(Continued)

(52) U.S. Cl.
CPC ............... *B29C 70/742* (2013.01); *B29C 70/52* (2013.01); *B29C 70/526* (2013.01);
(Continued)

(58) Field of Classification Search
CPC .... B29C 70/526; B29C 70/52; B29C 70/527; B29C 70/528; B29C 70/742; B29C 70/74; B29L 2022/00; B29L 2031/10; B29L 2023/00; B29L 2009/00; B29D 23/00; E04C 5/03; E04C 5/07; E04C 5/20
USPC ......................................................... 425/505
See application file for complete search history.

(56) References Cited

U.S. PATENT DOCUMENTS

| 3,283,050 A | 11/1966 | Boggs |
| 4,265,981 A | 5/1981 | Campbell |

(Continued)

FOREIGN PATENT DOCUMENTS

DE 2500375 8/1976

OTHER PUBLICATIONS

"FRP Fire Resistance". 1p.
(Continued)

*Primary Examiner* — Michael C Miggins
(74) *Attorney, Agent, or Firm* — Kolisch Hartwell, P.C.

(57) ABSTRACT

Apparatus possessing elongate, long-axially aligned componentry for making hollow, composite-material rebar including (a) a hollow mandrel disposed upstream in the apparatus, (b) a hollow pultrusion die circumsurrounding the mandrel for forming a composite-material hollow core in the space between it and the mandrel, and (c) a hollow, continuous-transfer-molding die spaced downstream from the pultrusion die, having a central long axis about which it is rotatable, operable to form, along the length of a core which has been formed in the pultrusion die, (1) an elongate, composite-material, core-circumsurrounding, hollow sleeve having an outer surface, and (2), unitarily with the sleeve, and in a manner distributed along the length of the sleeve's outer surface, an external-purchase-enhancing structure possessing radial-dimensionality.

5 Claims, 4 Drawing Sheets

(51) Int. Cl.
  *E04C 5/03* (2006.01)
  *E04C 5/07* (2006.01)
  *E04C 5/20* (2006.01)
  *B29D 23/00* (2006.01)
  *B29L 9/00* (2006.01)
  *B29L 23/00* (2006.01)
  *B29L 22/00* (2006.01)
  *B29L 31/10* (2006.01)

(52) U.S. Cl.
  CPC ............ *B29C 70/527* (2013.01); *B29C 70/528* (2013.01); *B29C 70/74* (2013.01); *B29D 23/00* (2013.01); *E04C 5/03* (2013.01); *E04C 5/07* (2013.01); *E04C 5/20* (2013.01); *B29L 2009/00* (2013.01); *B29L 2022/00* (2013.01); *B29L 2023/00* (2013.01); *B29L 2031/10* (2013.01)

(56) References Cited

U.S. PATENT DOCUMENTS

| | | | |
|---|---|---|---|
| 4,296,060 | A | 10/1981 | Killmeyer et al. |
| 4,780,166 | A | 10/1988 | Hunter |
| 4,814,133 | A | 3/1989 | Matsuno et al. |
| 5,055,324 | A | 10/1991 | Stecker |
| 5,084,221 | A | 1/1992 | Matsuno et al. |
| 5,166,230 | A | 11/1992 | Stecker |
| 5,182,064 | A | 1/1993 | Ishizuka et al. |
| 5,567,374 | A | 10/1996 | Thicthener et al. |
| 5,593,536 | A | 1/1997 | Kaiser |
| 5,593,744 | A | 1/1997 | Van Vechten et al. |
| 5,609,806 | A | 3/1997 | Walsh et al. |
| 5,626,700 | A | 5/1997 | Kaiser |
| 5,650,109 | A | 7/1997 | Kaiser et al. |
| 5,702,816 | A | 12/1997 | Kaiser |
| 5,729,952 | A | 3/1998 | Dahl |
| 5,763,042 | A | 6/1998 | Kaiser et al. |
| 5,851,468 | A | 12/1998 | Kaiser |
| 5,876,553 | A | 3/1999 | Kaiser |
| 5,904,886 | A | 5/1999 | Stecker |
| 5,950,393 | A | 9/1999 | Stecker |
| 5,966,895 | A | 10/1999 | Stecker |
| 6,023,903 | A | 2/2000 | Stecker |
| 6,197,395 | B1 | 3/2001 | Van Vechten et al. |
| 6,221,295 | B1 | 4/2001 | Kaiser et al. |
| 6,316,074 | B1 | 11/2001 | Kaiser et al. |
| 6,403,004 | B1 | 6/2002 | Stecker |
| 6,485,660 | B1 | 11/2002 | Kaiser et al. |
| 6,493,914 | B2 | 12/2002 | Kaiser et al. |
| 2005/0123374 | A1 | 6/2005 | Thorning |
| 2008/0261042 | A1 | 10/2008 | Brandstrom |
| 2010/0031607 | A1 | 2/2010 | Oliva et al. |
| 2012/0066994 | A1 | 3/2012 | Gibson et al. |

OTHER PUBLICATIONS

"Composite Rebar Manufacturers". 1p.
"TUF-BAR TM Fibreglass Reber", Composites Ltd., 2pp.
"Pultrall V ROD". 1p.
"The Solution for Corrosion", V ROD. 6pp.
"Fiberglass Reber", Aslan FRP Hughes Brothers. 4pp.
"Glass Fiber Reinforced Polymer (GFRP) REBAR" Aslan 100 by Hughes Brothers. 2007. 12pp.
"RockBar Corrosion resistant basalt fibre reinforcing bars", MagmaTech. 2pp.
"Fibreglass (GFRP) Rebar Infrastructure Applications", Composites Ltd. 34pp.
"FiReP GRP Bolts Bolting Systems for Mining and Tunneling". 12pp.
"FiReP(R) Product Brochure". 20pp.
"Technical Information Schock Combar(R)", Mar. 2006. 23pp.
"C-BAR Product Guide Specification", Marshall Composite Systems, LLC. 10pp.
"Specification for Carbon and Glass Fiber-Reinforced Polymer Bar Materials for Concrete Reinforcement, An ACI Standard", American Concrete Institute. 10pp.
"TBM Launch & Reception Soft Eye Openings", Aslan FRP. 12pp.
"Carbon Fiber Reinforced Polymer (CFRP)", Aslan 200 by Hughes Brothers. 7 pp.
"FRPDistributors.com Home Page". 3pp.
"GFRP Rebar Specifications". 6pp.
"GFRP vs. Steel". 27pp.
"Hughes Brothers Website Notes:" 13pp.
"Fibre reinforced composite". 2pp.
"Products Features Unique to TUF-BAR TM fibreglass rebar". 8pp.
U.S. Patent and Trademark Office, Office action regarding U.S. Appl. No. 14/447,496, filed Feb. 13, 2015, 21 pages.
Canadian Intellectual Property Office, Office action regarding Canadian Patent Application No. 2,849,375, Mar. 26, 2015, 3 pages.

Fig. 9

HOLLOW, COMPOSITE-MATERIAL REBAR FABRICATION APPARATUS

CROSS-REFERENCES TO RELATED APPLICATIONS

This application is a Division of co-pending U.S. patent application Ser. No. 13/215,199, filed Aug. 22, 2011, for "Hollow, Composite-Material Rebar Structure, Associated Components, and Fabrication Apparatus and Methodology", which application claims filing-date priority to U.S. Provisional Patent Application Ser. No. 61/385,502, filed Sep. 22, 2010, for "Hollow Composite Rebar and Associated Structure and Methodology", the entire disclosure contents in which applications are hereby incorporated herein by reference.

BACKGROUND AND SUMMARY OF THE INVENTION

This invention pertains to hollow, composite-material, core/sleeve rebar structure, and in particular to apparatus for making such structure. This apparatus is described and discussed herein in a context which features references to both (a) structural and operational features of the produced rebar structure, per se, and (b) aspects of the fabrication methodology which is implemented by the apparatus.

The core/sleeve rebar structure created by the apparatus of the present invention features a central, circularly cylindrical, elongate, hollow core, and a jacketing, i.e., circumsurrounding, specially, molecularly-joined, circularly cylindrical, elongate, hollow sleeve. The core is formed in a pultrusion die from a thermoset plastic resin (preferably urethane-modified vinyl ester) which embeds a plurality of elongate, substantially linear, long-axis-tension-carrying-capable, reinforcing fibers, preferably made of e-glass. The sleeve, also referred to herein as a jacket, is formed in a rotational, transfer-molding die preferably from the same thermoset-plastic, urethane-modified vinyl ester resin which is used in the core. The jacketing resin, which preferably takes the form of what is considered a conventional, i.e., well-known, bulk-molding-compound (BMC) material, embeds a plurality of randomly distributed, randomly oriented, "chopped" (i.e., short, typically $1/32$-$1/2$-inches) reinforcing fibers, preferably made of carbon or basalt. This sleeve, in an operative, structural-in-corporation setting for the overall, completed rebar structure in a body, or mass, of surrounding concrete, responds, as it seems, via the included, multi-directionally oriented, short fibres, "multidirectionally", by "gathering" the surrounding environmental, concrete-borne forces and directing them effectively into the long, linear, axially extending, tension-capable fibres present in the hollow core.

Created integrally with and as a part homogeneously of the preferred, BMC-material sleeve, on and along its outside surface, is an outwardly radially projecting, "purchase-enhancing", elongate ridge structure in the form, preferably, of continuous elongate, double-helix winds which, under circumstances with the completed rebar structure viewed in side elevation, present the appearance of evenly spaced screw threads. It will become evident to those skilled in the relevant art that other forms of purchase-enhancing structure may be created for rebar employment, if desired.

Lying in the background of, and furnishing an underpinning basis for, the creation and development of the hollow, composite-material rebar, which is the "to-be-created" subject matter of the fabrication apparatus of the present invention, are certain comparative-advantage, and also difficulty, issues that have been, and that continue to be, experienced differentially in the conventional, predecessor fields involving both long-standing, traditional steel rebar, and more recently, solid, composite, or composite-material, rebar. Steel rebar has, of course, been utilized in the field of infrastructure-reinforcing settings for decades, and solid, composite rebar has now been available and in similar use, for example in the United States, for many (but fewer) years. Solid, composite rebar's generally successful use in various projects implemented during these later years in various types of infrastructure installations has led to its (composite material's) approval for use now in a variety of concrete structures, and the present invention is squarely aimed at offering special apparatus that is designed for producing significantly improved, composite-material rebar structures that enhance such structures' utility in this field.

As those knowledgeable in the art are aware, solid, composite rebar, now conventionally available, offers a number of advantages (with only a few drawbacks) over conventional steel rebar. Non-exhaustively expressed, these advantages include (a) longer-life tolerance against functional and structural degradation—degradation relating to interactive presence in certain environmental, concrete-surround conditions, (b) avoidance of induced proximity damage to surrounding, contacting concrete, (c) low negative impact (resulting from (b)) on the "outside" environment (explained below), and (d) materials-handling, etc. cost savings.

Regarding such advantages, while composite rebar use, in comparison with steel rebar use, in typical concrete infrastructure applications, such as in roads, bridges, tunnels, airport runways, levies and parking decks, clearly offers the benefit of lower transportation and material-handling costs due to the fact that composite rebar material is only about one-quarter the weight of equivalent-diameter steel, its main economic appeal, associated with others of the above-stated advantages, is its ability, through avoiding structural degradation, dramatically to extend the life of a concrete structure in which it has been incorporated. More specifically, concrete structures that are built with steel rebar (either plain or epoxy coated) ultimately fail, and sometimes catastrophically, due to surrounding-environment-induced corrosion of the included rebar. As such rebar corrodes, it not only weakens and loses reinforcement capability, but more seriously, it expands substantially, and essentially "blows apart" the surrounding concrete mass (an event commonly known as spalling concrete, or crumbling infrastructure). "Mending" of such "from the inside" structural damage is typically neither simple nor inexpensive. Rather, repair usually dictates the need for complete structural replacement.

Composite rebar does not cause this kind of problem.

This "does not cause" statement can fairly be made even though there are certain "composite rebar" circumstances wherein some rebar degradation may occur, typically via slow, progressive, alkaline damage to "unshielded glass fibres" often employed as embedded, reinforcing inclusions in concrete-containing composite rebar. Such damage, however, does not produce the dramatically disruptive "blow-apart" phenomenon mentioned above associated with decaying, concrete-held, steel rebar.

Composite rebar use therefore provides a dramatic, and strikingly measurable, advantage when compared to steel rebar use in concrete construction; and while that advantage is, as just outlined, primarily a cost saving advantage due to the extended life consideration for a utilizing project, there is another substantial, and related, benefit which involves an important environmental consideration.

Concrete is perhaps the most ubiquitous building material in the world. It works well, is relatively inexpensive, and is readily available. When a structure fails, as just above described, due to corroding steel rebar, replacement structure must be created with new concrete for the reason that the cement component in concrete cannot be recycled. With this in mind, and recognizing that cement-making, as an industry, generates, and releases into the atmosphere, a significantly high contribution of $CO_2$, minimizing concrete usage as much as possible is a very real concern and intention. It will, accordingly, be evident that the use of composite, instead of steel, rebar in concrete structures successfully addresses this concern by deferring, or even eliminating, the need to replace old rebar-reinforced concrete with new.

While, therefore, solid, composite rebar thus distinguishes itself favorably and advantageously in many ways over traditional steel rebar, it also, as was briefly suggested above, exhibits certain drawbacks that result principally due to its "solidness"—limitations which, importantly, are now successfully addressed by the features of the present, "hollow", two-main-component core/sleeve, composite rebar invention, shortly to be more fully discussed. Notable among the recognized limitations of solid rebar is the so-called "size effect", or "shear lag", issue which becomes evident as the overall outside diameter of such a rebar is increased in the context of offering, or so it is hoped, "more robust" rebar reinforcement in certain applications. The terms "size effect" and "shear lag" will hereinafter be employed interchangeably. Such a rebar diameter increase, unfortunately, and as is well understood by those skilled in the art, causes the core region of a conventional solid, composite rebar progressively to lose core-area efficiency in terms of strength and load handling due to early, differential catastrophic failures that occur in the outer core-reinforcing fibres. Moreover, as the diametral size of traditional, solid, composite rebar increases, so also do the attendant, material-volume usage, and the associated, material-end-product cost. Thus, the "shear-lag" problem confronts traditional composite rebar-usage designers with the dilemma that an increase in rebar diameter size to achieve hoped-for greater reinforcing strength leads to the combined negative effects of (a) an actual, non-proportional (i.e., less than directly following) core-strength increase, and (b), increased material usage and cost.

As will become apparent, the hollow, composite-material, core/sleeve rebar structure which is fabricated by the apparatus of the present invention, while retaining all of the important advantages offered by conventional, solid, composite rebar, both significantly addresses, correctively, the solid rebar limitations just mentioned, and at the same time introduces important additional advantages.

The apparatus offered and employed by the present invention to make hollow rebar structure of the style just described, and the associated making methodology which this apparatus implements, collaboratively contribute significantly to fabrication of the enhanced structural and performance capabilities of the above-described configuration of rebar structure.

Presented immediately below, under appropriate side headings, is further background and summary information relating to various invention-associated considerations and features. These side-heading topics include (a) resulting, fabricated rebar structure, per se, (b) related fabrication methodology, and (c) the apparatus proposed herein for implementing that methodology.

Hollow, Composite, Core/Sleeve Rebar Structure

The rebar structure fabricated by the apparatus of the present invention takes the form of an elongate, composite-material (thermoset plastic and elongate, liner, reinforcing fibres), hollow, or tubular, structure having a long axis, and including, (a) an elongate, hollow, pultrusion-die-formed core centered on that axis and possessing an outer surface, (b) an elongate, hollow, rotationally-transfer-die-molded sleeve having inner and outer surfaces, circumsurrounding, and bonded via its inner surface to, the core's outer surface along the core's length, and (c) longitudinally distributed, radial-dimensionality, external-purchase-enhancing structure formed unitarily and homogenously, in the same rotational transfer-molding process employed for the sleeve, with and along the length of the sleeve's outer surface. Preferably, though not necessarily, the core and sleeve are circularly cylindrical, and the purchase-enhancing structure takes the form of a pair of elongate, continuous, double-helical winds projecting radially outwardly from and along the sleeve's outer surface. It is this condition of radial, outward projection of the helical winds, relative to the outer surface of the sleeve body, which is what is meant by the phrase "radial-dimensionality".

Rebar hollowness, and the setting of the bonded, core/sleeve combination which centrally defines the rebar structure of the present invention, collaborate to offer some surprising and significant performance advantages over all known rebar structures, including certain unique load managing and handling advantages.

Importantly, the bond existing between the core and sleeve, according to preference, and promoted by the operation of the fabrication apparatus of the present invention, takes the form of a single-cure, dual-plastic-material (formed combinationally by that plastic resin material present in the core and that also present in the sleeve), molecular bond, and in a more particular sense, what is referred to herein as a dual-plastic-material, reverse-temperature-gradient-cure, molecular bond—a bond which has resulted from a single, plastic-curing procedure driven by an appropriate temperature gradient defined (a) by a higher temperature created and existing in the central, hollow interior of the core within the rotational transfer-molding die in the proposed apparatus which homogeneously forms the sleeve and the purchase-enhancing structure, and (b) by a suitably lower temperature created immediately outside the core-circumsurrounding sleeve through the wall of the rotational transfer-molding die.

An assisting, and optionally additional, mechanical bond, based chiefly upon appropriate, pre-bonding surface roughening of the outer surface of the pultrusion-formed central core, may also be employed.

In the apparatus-created rebar structure prepared in accordance with the fabrication practice of the present invention, the core is formed of a thermoset plastic resin containing embedded, elongate, continuous, reinforcing fibres, preferably e-glass, and the sleeve and the purchase-enhancing structure are formed, as mentioned above, of a compatible, thermoset plastic resin which contains embedded, randomly-ordered, chopped (short), reinforcing, and preferably carbon fibres. The preferred sleeve material, generally speaking, takes the conventional form of what is known as bulk-molding-compound (BMC) material, wherein the included, chopped fibres are made of at least one of carbon (preferred) and basalt. BMC also variously contains other well-known ingredients, conventionally included, and is not therefore discussed in any greater detail herein. We recognize that those skilled in the relevant art will readily choose an appropriate, specific BMC mix, or blend, to invoke their implementations of the apparatus of the present invention.

The sleeve, per se, in the rebar structure made according to practice of the present invention is independently expressible as being a jacketing structure for an elongate, hollow-rebar, central core having a long, core axis, with the sleeve possessing (1) an elongate, hollow body formed with a long axis, (2) a hollow interior (in its body) which is adapted to receive, bondedly, such a core in a manner wherein the two, mentioned long axes are substantially coincident, and (3) an outside surface on the sleeve body which includes, distributed along its length, unitarily formed, longitudinally distributed and extending, radial-dimensionality, external-purchase-enhancing structure.

The apparatus-fabricated rebar structure essentially offers all of the advantages of conventional, solid, composite rebar over steel rebar, as mentioned above, while at the same time (a) avoiding the drawbacks which have been associated with such predecessor composite rebar, and in fact (b), introducing several new advantages over all known, conventional rebar structures.

For reasons not completely understood, and which have surprised us, the overall rebar structure made by the apparatus of the present invention, and which structure is hollow, both in its core, and in its included, core-circumsurrounding sleeve, turns out substantially to avoid, or at least greatly to minimize, the negative "size effect" issue which is presented by solid, composite rebar structure. The central core which, as mentioned, includes elongate generally linear embedded (preferably e-glass) fibers has been found to provide superior tensile load-handling characteristics without any appreciable introduction of a "size effect" problem. These fibers, of course, extending as they do along the long axis of the core, are oriented most appropriately for handling expected high tensile loads when the rebar structure is placed in operative condition within a surrounding mass of concrete.

The surrounding sleeve, which includes short-length, randomly oriented and distributed fibers of a different material character (preferably carbon, or alternatively basalt), and which typically (in use) resides within the alkaline environment of surrounding concrete, does not exhibit fiber degradation on account of that environment; and, because of its circumsurrounding and jacketing disposition with respect to the inner hollow core to which it is bonded, guards that core, and specifically the preferred e-glass fibers in that core, against degradation-producing exposure to direct contact with the surrounding alkaline "world" of concrete. Additionally, the random-orientations of the short fibers which characterize the construction of the core-jacketing sleeve function extremely effectively, and surprisingly, as we have learned, in private and confidential testing, to "gather" and direct into the linearly extending elongate fibers in the core, the various appropriate vector components of forces which develop in a surrounding mass of load-bearing concrete.

The fact that the configuration of hollow rebar structure made by the apparatus of the present invention effectively is made up of two, principal tubular components—components which differ from one another chiefly in the nature of the material used in the included reinforcing fibers—thus characterizes a combined, overall rebar structure which not only survives well within an alkaline, concrete environment wherein it is employed, but also uniquely functions both (a) to gather, and transmit (via multi-directionally oriented fibres) very effectively into the central core, surrounding forces so as to produce noticeably superior tensile load handling (via elongate, substantially parallel linear fibres) within the core, and (b) to do this in a setting wherein "size effect" difficulties that are associated with "differently sized and different-strength" rebar structures have not appreciably materialized. The differential-material characters of the fibres in the sleeve and the core produce a "best of many worlds" behavior for this rebar structure, with the included fibres in each of these two, collaborating structural components functioning most appropriately in their respective "rebar settings".

In connection with the just-mentioned, important, "different-strength", non-problematic "size effect" consideration, an extremely interesting feature of the hollow rebar structure produced according to the invention is that, while various outside, overall sleeve diameters may be created effectively to furnish a range of nominal, staged-strength rebar sizes, it turns out to be the case that, for a given rebar structure with a particular outside sleeve diameter, merely by operating the apparatus of the invention to change alone the wall thickness of the internal core, an interesting range of different rebar strength sizes is attainable. Not only is this feature of practice of the invention by itself interesting, beyond this "rebar-internal" feature, within a given structural-use environment involving a particular, set-outside-dimension mass of concrete, and without in any way diminishing, or otherwise altering, the volume (the internal content) of that mass (which possesses its own pre-design, load-carrying capacity) to accommodate differences in the outer diameter of intended, embedded reinforcing rebar structure, simply by changing wall thickness of the included, inside, tubular core in the rebar structure, there are available different, rebar-strength-reinforcement choices for such a concrete mass.

Put another way, by allowing for effective rebar strength changes simply through changing wall thickness in the included inside core, without changing outside diameter dimensions of the sleeve, such allowing effectively makes the changing of rebar "strength sizes" independent of surrounding, pre-design mass dimensions of concrete. In this context, one will note that, with conventional solid, composite, or steel, rebar structure, and for a given-outside-dimension mass of concrete, a diameter change in the outside dimensions of such rebar structure automatically requires a change in the surrounding volume of the, pre-dimension-determined, given mass of concrete, with more concrete being employed with smaller-diameter rebar structures and less concrete being employed to accommodate larger-diameter rebar structures. This, of course, is a situation in which surrounding concrete mass, for a given, desired, set of outside dimensions, is not independent of rebar "size strength".

Another feature of the apparatus-fabricated hollow rebar structure made in accordance with the present invention is that it offers, for useful and innovative employment, the internal, hollow, central channel for the "routing", for example, of various kinds of infrastructure possibilities like cabling or fluid conveyance (such as for controlling anti-freezing of bridge surfaces), as well as the selective introduction of protected (i.e., shielded), additional strengthening elements, such as inserted steel bars, if desired. Additional creative use of the hollow aspect of this rebar structure might include the installation therein of various types of information-generating sensors to improve utilization of a rebar-reinforced structure, for example for optimizing traffic flow on bridges, for monitoring use-history in order to schedule maintenance more effectively, for monitoring load management, and for other things.

Apparatus-Implemented Fabrication Methodology

From one methodologic point of view, the methodology implemented by the apparatus of the invention may be expressed as a method of making an elongate, composite-material, hollow rebar structure including the steps of (a) forming an elongate, composite-material, hollow core, (b) in association with such forming, preparing along the core's length an elongate, composite-material, core-circumsurrounding, hollow sleeve having inner and outer surfaces, (c) in association with such preparing, creating, unitarily with the sleeve, and in a manner distributed along the length of the sleeve's outer surface, an external-purchase-enhancing structure possessing radial-dimensionality, and specifically in the form of a pair of elongate, continuous, generally helically paralleling winds extending along the length of the sleeve's outer surface, and (d) bonding the inner surface of the sleeve to the outer surface of the core. Preferably, this methodology is carried out in manners whereby the core-forming step is performed by pultrusion, and the preparing and creating steps are implemented by continuous transfer-molding within a rotational die.

In this methodology, bonding is implemented preferably in a manner which establishes between the core and sleeve a bond in the form of a single-cure, dual-plastic-material molecular bond, and in the more particular sense expressed above herein, what is referred to herein as an important, dual-plastic-material, reverse-temperature-gradient-cure bond as generally described.

As mentioned also above, a mechanical bond may be implemented by the apparatus of the invention.

From another point of view, the invention methodology implemented by features included in the apparatus of the invention may be described as a method of making an elongate, composite, hollow rebar structure featuring (a) forming, in a pultrusion die, an elongate, composite-material, fibre-reinforced, curable-plastic-material-including, hollow core, (b) applying heat within the pultrusion die to create, for the core's included plastic material as it emerges from the die, an outer-surface plastic condition which is less than 100% cured, (c) in association with, and downstream from, the forming step, preparing, in a rotational, continuous-transfer-molding die, on the less-than-100%-cured, outer-surface plastic of the emerging core and along its length, an elongate, hollow, composite-material, fibre-reinforced, curable-plastic-material-including, core-circumsurrounding sleeve, (d) in relation to such preparing, and within the transfer-molding die, creating, unitarily with the sleeve, and in a manner distributed along the length of the sleeve's outer surface, an external-purchase-enhancing structure possessing radial-dimensionality, and (e) within the transfer-molding die, applying heat to effect between the plastic material in the core and that in the sleeve a single, reverse-temperature-gradient-cure, plastic-material bond.

In the practice of the present invention through performance of the invented apparatus, making of the resulting, two-component, core/sleeve rebar structure is especially accommodated by, and in relation to, the just-above-outlined methodology which involves the under-curing of plastic resin material during the core-forming pultrusion process—an under-curing procedure referred to as B-staging which assures that, as the formed core emerges from the pultrusion-forming die, the surface condition of the resin in that core, which is a bonding surface, has enough of a temporarily-lasting, under-cured condition so that subsequent bonding with the inner surface of the about-to-be-downstream-formed sleeve takes place in a very robust manner.

Fabrication Apparatus

According to the present invention, the proposed special apparatus for fabricating rebar structure of the type mentioned above includes a long, rebar-formation axis, and spaced therealong, what are referred to herein as upstream and downstream regions. Progressing along the apparatus rebar-formation axis, from the upstream region toward the downstream region, the apparatus further includes (1) an elongate, hollow mandrel having a long axis which is substantially coincident with the rebar-formation axis, and extending from adjacent the upstream region toward adjacent the downstream region, (2) an elongate, hollow pultrusion die disposed operatively adjacent the upstream region, having a long axis which is substantially coincident with the rebar-formation axis, circumsurrounding the mandrel, and operable to form an elongate, composite-material, hollow core in the region disposed between itself and the mandrel, and (3) an elongate, hollow, transfer-molding die disposed downstream, and spaced, from the pultrusion die, having a long axis about which it is rotatable and which is substantially coincident with the rebar-formation axis, the transfer-molding die being operable to form, along the length of a core which has been formed upstream by the pultrusion die, (a) an elongate, composite-material, core-circumsurrounding, hollow sleeve having an outer surface, and (b), unitarily with the sleeve, and in a manner distributed along the length of the sleeve's outer surface, an external-purchase-enhancing structure possessing radial-dimensionality.

The apparatus of the invention, as just generally described, further includes plural heaters distributed in spaced relation with respect to one another along the rebar-formation axis, and disposed in operative adjacency relative to, and in association with, the pultrusion and transfer-molding dies. These heaters uniquely feature special, internal heating structure which is disposed within the above-mentioned hollow mandrel where it extends through and within the transfer-molding die—this internal heater being operable to produce a "reverse", radially outwardly directed (relative to the rebar-formation axis) heat gradient.

The importance of this feature in creating a robust core-sleeve bond has been mentioned above.

Additionally included in the apparatus of the invention is a power-driven puller disposed downstream along the rebar-formation axis in spaced relation to the transfer-molding die, operable to pull a forming rebar through the dies in a downstream direction along the rebar-formation axis under the influence of a drive motor. This drive motor operates the puller at a speed which moves a forming rebar along the rebar-formation axis at a rate relative to the pultrusion die and to the heaters which are operatively associated with that die whereby the outer surface of plastic material in core structure emerging downstream out of the pultrusion die, and later entering the transfer-molding die, is, and remains during transit between the dies, in a less-then-100% cured condition.

These and various other features and advantages of, and offered by, the apparatus of the present invention will become more fully apparent as the detailed description of it below is read in conjunction with the accompanying drawings and the appended claims.

DETAILED DESCRIPTION OF THE INVENTION

Figure 1:
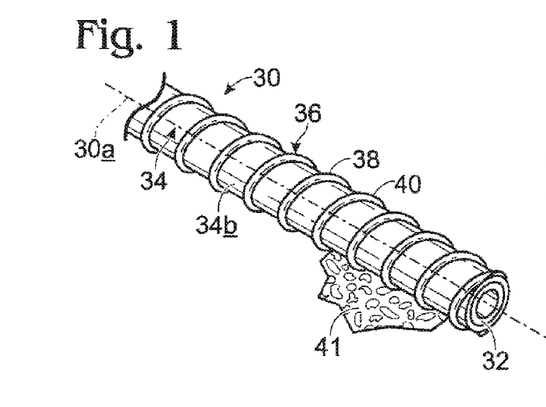
FIG. 1 is a fragmentary, isometric view illustrating a hollow, elongate, composite-material rebar structure, or rebar, made by a preferred and best-mode embodiment of the apparatus of the present invention. This rebar structure includes a core, a circumsurrounding/jacketing sleeve, or jacket, and on the outside of the sleeve, radial-dimensionality, external-purchase-enhancing structure in the form of a pair of evenly spaced, dual, helical winds.
Figure 2:
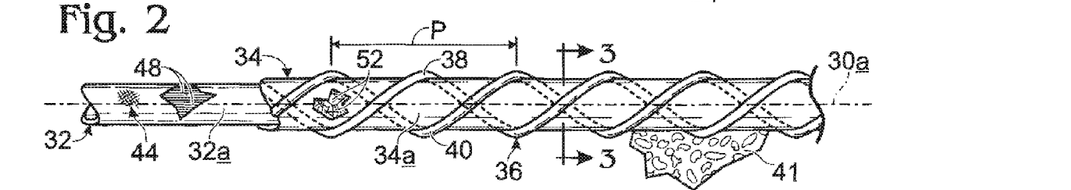
FIG. 2, which is drawn on about the same scale employed in FIG. 1, is a fragmentary side elevation of the rebar structure of FIG. 1, with a portion of the jacketing sleeve removed.
Figure 3:
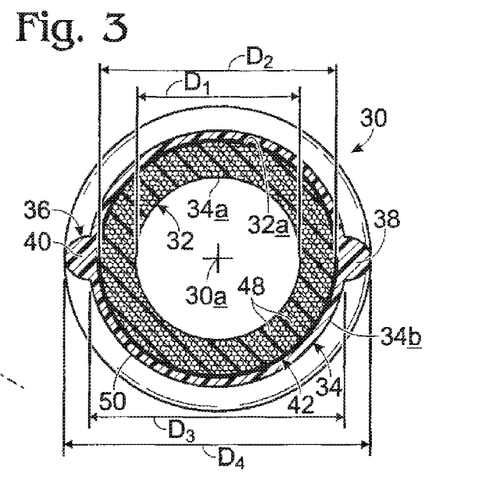
FIG. 3 is a larger-scale, cross-sectional view taken generally along the line 3-3 in FIG. 2.

Turning now to the drawings, and referring first of all to FIGS. 1-3, inclusive, indicated generally at 30 is an elongate, linear, composite-material, hollow rebar, or rebar structure, constructed in accordance with fabrication performed by a preferred and best-mode embodiment of the apparatus of the present invention, which apparatus will shortly to be described in detail in relation to FIGS. 6A-9, inclusive.

Rebar 30, which has a long axis seen at 30a, includes a central, hollow, circularly cylindrical, composite-material pultruded core 32, to the outer surface 32a of which is bonded the inner surface 34a, of the main body of a hollow, circularly cylindrical, composite-material, rotationally transfer-molded sleeve 34. Formed integrally and homogenously with the sleeve's main body, and disposed on, and along the length of that body's outer surface 34b, is what is referred to herein as radial-dimensionality, external-purchase-enhancing structure 36, also referred to herein as helical ridge structure. Ridge structure 36, in the style of rebar structure which is now being described, includes a pair of evenly spaced, continuous, parallel, helical winds 38, 40 that project radially outwardly from the sleeve body's outer surface relative to rebar axis 30a. This ridge structure plays the evident role of furnishing excellent, longitudinal-positional-stability purchase for the rebar when it is in place within a body of surrounding concrete, such as that shown fragmentarily at 41 in FIGS. 1 and 2.

The main, central, cylindrical body of sleeve 34, along with ridge structure 36 formed by winds 38, 40, are referred to herein collectively as a hollow-interior jacket, or jacketing structure.

Looking specifically at FIG. 3, the heavy, darkened, circular line which is indicated at 42, and which lies at the interface between core 32 and sleeve 34, represents the above-mentioned, surfaces 32a/34a bond that exists between the core and sleeve portions of rebar 30—a very special bond created by the apparatus of the invention, which bond takes the form herein of what is referred to as a single-cure, reverse-temperature-gradient-cure, plastic-material, molecular bond that becomes created, as will later be explained, during the process of fabricating sleeve 34 over, around, and along the length of, core 32.

In certain instances, bond 42 may be enhanced by the apparatus of the invention to have certain, additional mechanical characteristics, as, for example, by the presence of a roughened-surface interface prepared, as will be explained later herein, on surface 32a of core 32 prior to formation of sleeve 34 around the core. Accordingly, indicated generally by a small cross-hatched surface marking 44 in FIG. 2 is a small patch which represents the modification alternative of including such a roughened surface texture.

As was mentioned above, core 32 is, according to implementation of the apparatus of the present invention, a pultruded structure. It is formed of a suitable thermoset plastic resin, preferably such as urethane-modified vinyl ester, in which are embedded plural, elongate, preferably e-glass fibres whose long axes substantially parallel rebar axis 30a. The resin present in core 32 is indicated at 46 in FIG. 2, and the embedded fibres are indicated generally at 48 in FIGS. 2 and 3. In the form of rebar structure now being described, the core-embedded fibres occupy about 77% by volume of the core. While e-glass fibres are preferred in the core, other fibre materials, such as s-glass, basalt and carbon, may be used, if desired. No matter what core fibre is included, in the ultimate, traditional use environment of surrounding concrete, all potentially alkaline-sensitive material in the core is shielded from the typical alkaline, surrounding-environmental character of concrete by sleeve 34.

Sleeve 34, and the winds in ridge structure 36 are formed, through operation of the invented apparatus, and as was generally mentioned above, by what is known as a continuous, transfer-molding procedure, and very specifically by such a procedure which is performed within a specially prepared rotational die that is cross-sectionally configured so as to produce not only the main body portion of the sleeve, but also the ridge-structure winds. This homogeneous sleeve and ridge-structure formation includes a mass of a suitable thermoset plastic resin, preferably the same as, i.e., common with, the already-mentioned urethane-modified vinyl ester resin in the core—importantly, a resin which, in any event, is compatible chemically and molecularly with the thermoset plastic resin used in the core, and, embedded in this sleeve-forming thermoset resin, a random-orientation, embedded distribution of very short, chopped (about ½-inches long) reinforcing carbon fibres which are oriented in multi-directions within the sleeve and ridge structure. The thermoset plastic resin material in the sleeve and ridge structure is indicated generally at 50 in FIG. 3, and the embedded, chopped fibers, which preferably occupy about 15% by volume of the sleeve and ridge structure, generally at 52 in FIG. 2. This sleeve and ridge structure is preferably formed by a generally conventional composition of what is known as bulk-molding-compound (BMC) which is prepared to include the mentioned thermoset resin and chopped carbon fibres. As was mentioned earlier herein basalt is a good alternative to carbon as the chopped fibre content in the integrated sleeve and ridge structure.

Those skilled in the art will readily understand that the various dimensions of the component portions making up rebar structure 30 may have a relatively wide range of satisfactorily usable and different dimensions, depending upon the particular application for that structure. Appropriate apparatus-component sizings furnished readily in the apparatus of the invention accommodate the fabrication of rebar structures possessing such selectable, different dimensions.

Dimensional changes in the rebar componentry play a role, of course, in the design load-handling capability of that structure. The fact that the structure, as a whole, is a hollow structure, results in substantial elimination of what was described above as the so-called "rebar size effect issue" which characterizes conventional solid, composite rebar, often referred to as solid, FRP (fibre-reinforced-polymer) rebar. Accordingly, relatively large outside diameter (overall) rebar structures are thus producible and usable for high load-handling requirements without the diminution of capability that characterizes solid-cross-section rebar structures.

Very interestingly, in addition to the fact that the central, hollow interior of the described rebar core structure accommodates a number of infrastructure capabilities in, for examples, buildings, roadways, etc., installations, such as providing a passageway for the flow of different fluids, and for electrical, fiber optical and other cabling, as well as for accommodating the internal employment of information-yielding load sensors for reasons such as those suggested above herein, is the further fact that the load-handling capability of a particular rebar structure, without in any way changing its outside dimensions, may be varied within a range of load-handling capabilities simply by changing the tubular wall thickness of the internal core structure. Especially interesting about this capability, readily enabled by rebar fabrication resulting from appropriately sized componentry in the apparatus of the invention, is that such changes in load-handling capability may be made without in any way altering the spatial volume occupied by rebar structure within surrounding concrete which itself is called upon to handle loadbearing. In other words, in the "world" of the present invention as such relates to rebar fabrication, there is provideable, through appropriate fabrication practice, a striking, and important, independence between rebar load-handling capability and surrounding concrete load-handling capability by virtue of the fact that a plurality of rebar load-handling capabilities lying within a range are possible without altering in any way—by diminution, for example—the load-handling capacity of the surrounding embedding concrete mass. In other words, and as an example, an increase in rebar load-handling capacity may be made without diminishing the mass volume of surrounding concrete, an action which would necessarily diminish also the load-carrying capacity of that concrete mass.

As will become more fully apparent when, a little bit later in this text, the proposed fabrication apparatus of the invention, and the associated, apparatus-implemented fabrication methodology, are described, this variable rebar load-handling capacity possibility is accomplished relatively simply by using a singular, outer rotational forming die for the transfer-molding creation of the core-surrounding sleeve, and then simply by changing the outer-diameter size of an inner, central mandrel which is employed in the apparatus of the invention to form and define the inside diameter of the rebar core structure.

For illustration purposes, and looking particularly at FIG. 3, in the particular rebar structure, 30, so far described, the inside diameter of core 32, shown at $D_1$, is 0.5-inches, the outside diameter of the core, shown at $D_2$, is 0.732-inches (this $D_2$ dimension also, effectively, being the inside diameter of sleeve 34), the outside diameter of the sleeve, shown at $D_3$, is 0.795-inches, and the "outside diameter" of ridge structure 36, shown at $D_4$, is 0.945-inches.

With these dimensions, rebar structure 30 is structurally equivalent to conventional No. 4 fibre-reinforced polymer (FRP) solid rebar. Simply by keeping the just-stated sleeve dimensions unchanged, and by changing the outside diameter of the mandrel (mentioned above herein) which is employed in the rebar-fabrication apparatus of the invention, it is possible to make a rebar structure which is structurally equivalent to conventional No. 3 and No. 5 FRP rebar.

Focusing for a moment on ridge structure 36, indicated at P in FIG. 2 is the pitch of the winds existing for each of winds 38, 40. These winds, as illustrated in FIG. 2, and for convenience-of-display purposes only, have been purposely, distortedly "pitch-stretched' along the outside of sleeve 34 in order to minimize image crowding in this figure. A preferred pitch for each of the two winds, in relation to the rebar dimensions just stated above, is about 1.45-inches of sleeve length, with the laterally visible (as in FIG. 2) stretch of each successive wind portion appearing to lie along a line extending at an upwardly and to the right angle of about 60° relative to axis 30a. The just-mentioned pitch stretching causes this angle, as it actually appears in FIG. 2, to be smaller than 60°.

Figure 4:
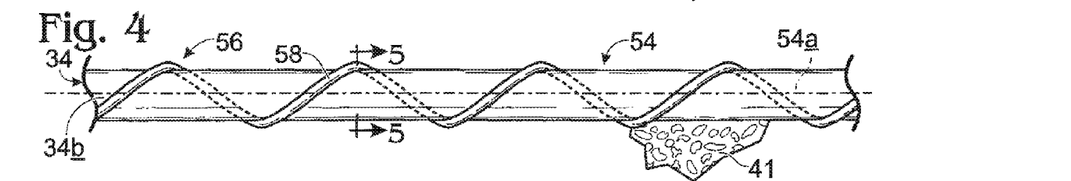
FIG. 4 is a fragmentary side elevation, somewhat like that which is presented in FIG. 2, and drawn on about the same scale, illustrating a modified form of the rebar structure made by a slightly modified form of the apparatus of the invention—this modified rebar-structure form differing from that of the rebar structure of FIGS. 1-3, inclusive, in relation to the specific configuration of the included, helical (here, a single wind) radial-dimensionality, external-purchase-enhancing structure.
Figure 5:
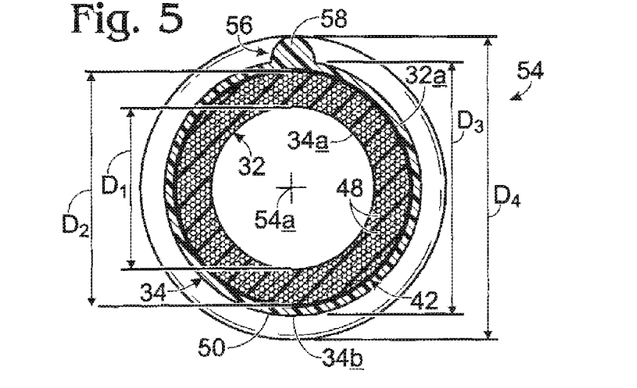
FIG. 5 is a cross-sectional view, drawn on approximately the same scale as that used in FIG. 3, taken generally along the line 5-5 in FIG. 4.

Directing attention now to FIGS. 4 and 5, here there is indicated generally at 54 a modified rebar structure having a long axis shown at 54a, and, while largely similar to rebar structure 30, differing from this first-described structure substantially only by the fact that it includes ridge structure 56 which is defined by but a single helical wind shown at 58. In all other respects, rebar structures 30, 54 are alike, and for this reason, like reference numbers are applied in FIGS. 4 and 5 to rebar component portions pictured there which are essentially the same as like components pictured in FIGS. 1-3, inclusive. Dimensions $D_1$, $D_2$, $D_3$, $D_4$, are identical. Rebar structure 54 is also shown associated with a surrounding body of concrete which represented by concrete fragment 41.

Considering aspects of the behavior of the hollow rebar structure described above herein (as formed by the apparatus of the present invention), in addition to those performance features which have already been touched upon, the relatively short, chopped, carbon (or alternatively basalt) fibers that are embedded during fabrication within the jacketing sleeve and ridge structure function, in addition to providing therein structural reinforcement, also are believed, because of their random, multi-directionality, to aid in "gathering" outside, environmental contact forces which the rebar structure will experience when embedded in load-bearing concrete, and in "delivering" appropriate vectors of such forces into the core in the rebar structure, and very specifically into the elongate, linear reinforcing fibers which are present in that core due to fabrication practice. These short and relatively densely organized carbon fibres also help to isolate, and to protect the e-glass fibres in the core from the potentially damaging alkaline environment of surrounding concrete.

The elongate core-embedded e-glass fibres, of course, carry the important tensile loads that are introduced into the rebar structure when it is in operative condition within load-bearing concrete.

The important bond which exists between the core and sleeve components in the described rebar structure plays a very significant role in the manner in which load-handling performance is implemented by that structure. The fact that this rebar structure includes, basically, the two-component, bond-united arrangement of a core and sleeve, (a) enables the construction and effective utilization of a tension-relevant core which is best designed for the handling of expected environmental tensile loads that will be experienced, and (b), introduces a core-protective, and special load-gathering and to-the-core-delivering jacketing structure which, among other things, helps to gather, multidirectionally, force vectors that become applied to the outside surface of the entire rebar structure. In a sense, therefore, the sleeve and the core are designed and fabricated, in terms of their internal reinforcing fibers structures, for, among other things, extremely effective and efficient load gathering and handling.

The manner in which core/sleeve bond 42 comes into being will be explained very shortly below as the apparatus of the invention which is utilized to create rebar structure of the type described, and the fabrication methodology which is implemented by that apparatus, are fully explained. Suffice it to say at this point that bond 42 is unique both in the sense of its resulting structural characteristics, and in relation to the manner in which it is fabricated in and by the invented apparatus. This bond robustly unites the core and sleeve structures so that their respective load distribution delivery and handling functions operate most effectively.

Hollowness in the overall structure deals effectively with the prior-art composite-material size-effect, shear-lag problem.

FIGS. 6A, 6B, and 7-9, inclusive, illustrate both (a) the preferred and best-mode embodiment of the apparatus of the invention which is employed to fabricate the hollow rebar structure as described above, and (b) the fabrication methodology that is implemented by this apparatus.

Figure 6A:
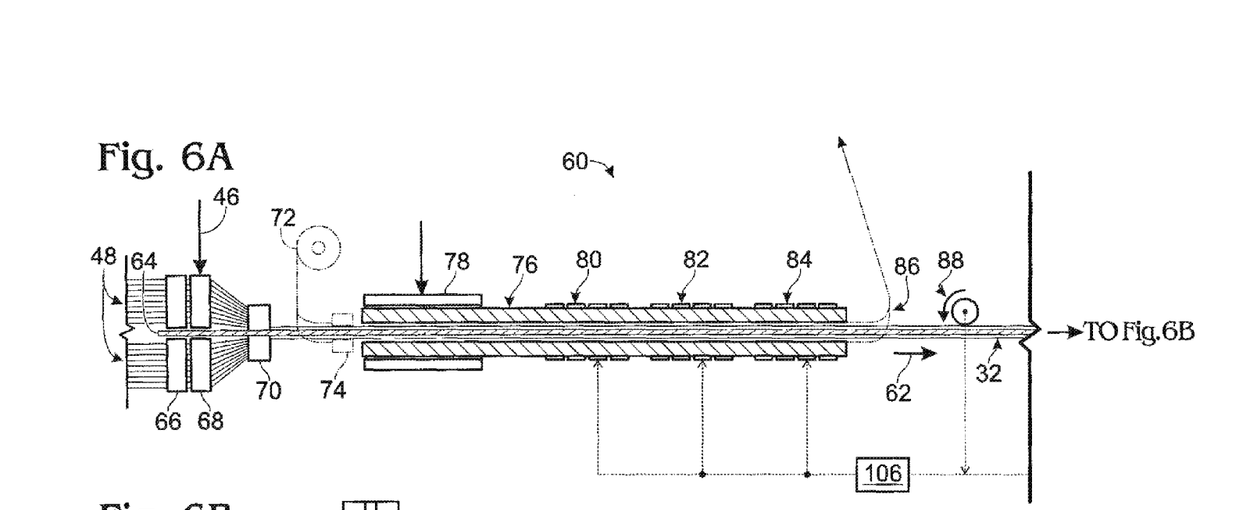
FIGS. 6A and 6B are laterally linkable split views collectively (when linked) presenting a simplified, schematic, overall, partly cross-sectional side-elevation of linearly-deployed apparatus made in accordance with a preferred and best-mode embodiment of the apparatus of the present invention employed in the manufacture of rebar structures like those pictured in FIGS. 1-5, inclusive. This split-illustrated apparatus is commonly disposed along what is referred to herein as a long, rebar-formation axis which is represented by a dash-dot line appearing adjacent the right side of FIG. 6B. Interconnected, dashed lines, with eleven, attached arrowheads, represent an operational-control interconnection existing in the apparatus of the invention between (1) various heaters, (2) a speed encoder, (3) a rotational transfer-molding die, (4) a final resin-curing oven, (5) a puller drive motor, and (6) components in a chop saw mechanism that are distributed along the length of the pictured apparatus.
Figure 6B:
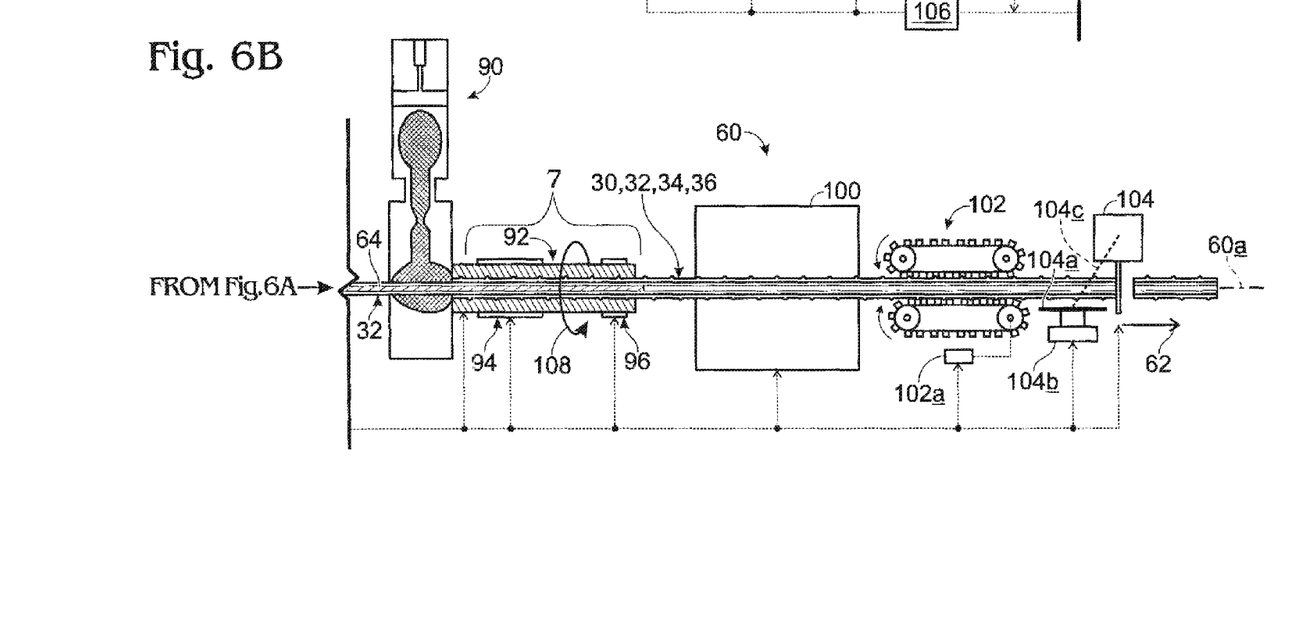

In schematic form, and visualizing that FIGS. 6A and 6B are appropriately laterally linked, the entirety of the preferred and best-mode embodiment of the rebar fabrication apparatus of the present invention is indicated generally at 60. Apparatus 60, also referred to as apparatus for making an elongate, composite-material, hollow rebar structure herein, has an overall length of about 20-feet, and possesses a central, long, axis 60a (see FIG. 6B) referred to as a rebar-formation axis. The left end of apparatus 60 in FIG. 6A is the upstream end, or region, of the apparatus, and the right-end of the apparatus as seen in FIG. 6B is the downstream apparatus end, or region. While different fabrication throughput speeds may be implemented under user selection, the throughput speed in apparatus 60 is substantially 12-inches-per-minute, with the throughput direction shown by a right-pointing arrow 62 in FIGS. 6A, 6B.

Extending in a manner centered on axis 60a, along most of the length of apparatus 60, is a tubular mandrel 64 which is suitably supported, and anchored in place, adjacent its upstream, left end in FIG. 6A. Its downstream, right end is closed by a fitted closure plug 64a, best seen in FIG. 7. Plug 64a also closes the right end (in FIG. 7) of a tubular, mandrel-internal heater shroud which will be discussed more fully below. The outside diameter of mandrel 64 herein is 0.5-inches—the dimension which defines the inside diameter of previously described core structure 32. The mandrel's inside diameter herein is 0.375-inches. In order to give mandrel 64 some visual distinction in the small scale of FIG. 6A, and also in that of FIG. 6B, its outside surface in these two figures carries angular surface marking.

Beginning, in a description of the contents of apparatus 60, adjacent the upstream region of that apparatus, and progressing downstream from that region, apparatus 60 includes a fiber guide structure 66, a fiber-bathing resin station 68, a resin-wetted fiber condenser 70, an optional surface-texturing, peel-ply delivery station 72 (shown in dash-double-dot lines), an optional peel-ply core wrapper 74 (also shown in dash-double-dot lines), an elongate, pultrusion die 76 having a long, central axis (not specifically marked) which coincides with axis 60a, a resin-cooling water jacket 78 surrounding and associated with the upstream end of pultrusion die 76, three, pultrusion-die-associated-and-surrounding heaters, or heating structure, 80, 82, 84, and an optional peel-ply stripping station 86 (represented in dash-double-dot lines).

Figure 7:
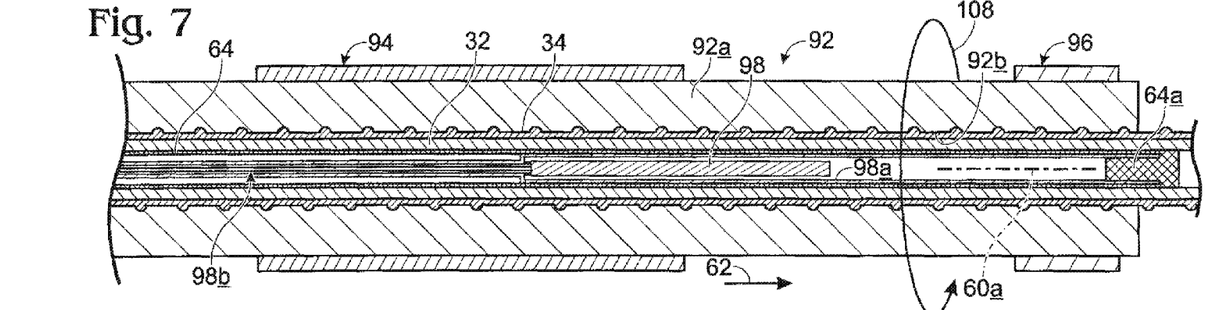
FIG. 7 is an enlarged, fragmentary, side-picturing cross section, taken generally in the region embraced by the bracket numbered "7" in FIG. 6B, showing in somewhat greater detail the rotational transfer-molding die region in the apparatus of FIGS. 6A, 6B.

Continuing downstream from optional station 86, apparatus 60 additionally includes a conventional, product-transport monitoring, rotary encoder 88, a bulk-molding-compound (BMC), high-pressure, injection system 90, a rotational, continuous-transfer-molding die 92, a pair of external, upstream/downstream heaters, or heating structure 94, 96, respectively, surrounding and associated with the outside of die 92, an internal heater 98, seen only in FIG. 7, disposed within the inside of mandrel 64 and positioned longitudinally as shown relative to heaters 94, 96, a resin-curing oven 100, a crawler-tread-, or caterpillar-, style, power-driven puller 102 (illustrated in FIGS. 6B, 8 and 9) whose "counter-revolving" treads are coordinatedly driven by a motor which is shown in simple, block form at 102a, and a chop saw 104. Chop saw 104 is suitably mounted for limited reciprocation, back and forth, on a rail structure 104a, and in a manner generally paralleling axis 60a, with this saw being so moved at appropriate moments under the influence of a reversibly-operable, motor instrumentality 104b which is controlled, as will be explained shortly, by an automated control system, still to be described. A connected, operative relationship between chop saw 104, rail structure 104a, and motor instrumentality 104b is illustrated by a dashed line 104c in FIG. 6B. Components 104, 104a, 104b, and connection 104c, collectively constitute a reciprocatable and activatable chop saw mechanism.

Within apparatus 60, all of the components, with the exception of mandrel-internal heater 98 and puller 102 (and its associated motor structures) are generally conventional in construction and operation. All forward motion of rebar materials moving through this apparatus is under the direct control of puller 102. In order that all necessarily interrelated component operations are properly coordinated, and while manual controlling to accomplish this is of course possible, there is preferably associated with apparatus 60 an appropriate, automated control system which is illustrated in block form at 106 in FIG. 6A—this control system including an appropriately programmed digital computer, which is connected operatively and "informationally", as shown distributively in FIGS. 6A and 6B by the evident plurality of dashed lines and associated arrowheads effectively connected to block 106, (a) to external heaters 80, 82, 84, (b) to rotary encoder 88 (for the receipt of information from this encoder), (c) to the motor (not illustrated) provided for driving rotational die 92 in the direction indicated by curved arrow 108, (d) to external heaters 94, 96, (e) to oven 100, (f) to motor 102a which drives puller 102, and through a pair of operative connections to components in the chop saw mechanism. Because of the drawing scale and spacings of components presented in FIG. 6B, the control connection which exists between system 106 and internal heater 98 is not here specifically pictured, but is, of course, present. This connection will be more specifically described in conjunction with a discussion presented later herein involving FIG. 7.

Regarding power-driven rotation of die 92, arrow 108 indicates that the die's rotational direction is counter-clockwise as the die is viewed along axis 60a from its downstream end.

The rotational speed for the mentioned throughput speed of about 12-inches-per-minute, and helical wind pitch of about 1.45-inches, is about 8.3-rpm.

Regarding several of the components identified above in apparatus 60, certain additional information will be presented below in the context of the apparatus fabrication process description which now follows.

Describing now the flow of rebar fabrication activity within apparatus 60, and looking at the overall apparatus as shown in FIGS. 6A and 6B, from suitably supported conventionally available supply spools (which are not pictured in FIG. 6A), e-glass fibres 48 are extended in appropriate runs from these spools to guide structure 66 whose guide elements define an appropriately configured "field", or array, of plural fibers which are to be directed centrally toward axis 60a onto the outside surface of mandrel 64 as a precursor to formation, in pultrusion die 76, of the core structure of an overall rebar structure. Those skilled in the art will understand fully how to select, route and create an appropriate fibre-filled field of the correct number of such fibers suitable to result in the production of a final hollow rebar structure wherein these fibers will contribute, in relation to the combined, thermoset resin, the above-mentioned, preferred volume occupancy of fibres in the formed core structure. One will note, of course, that the fibre content in this guided field will depend upon the core wall size (i.e., ID/OD) which has been chosen for the core.

From the guide structure through which the supplied fibres in the assembled field are routed, these fibres then pass through fibre bathing resin station 68 which receives, as indicated by a downwardly pointing arrow 46 disposed above it in FIG. 6A, an appropriate flow of the preferred and selected, core-intended, thermoset resin, such as that specifically identified above. In station 68, the fibers become heavily wetted/coated with this resin.

From station 68, the fibers are then routed centrally toward axis 60a and the outside surface of mandrel 64, and into fibre condenser 70 which effectively gathers all of these fibers and forms them, along with the wetting resin, into a precursor, composite-material core structure evenly surrounding mandrel 64, thence to emerge from the condenser in the direction of arrow 62 in progress toward the upstream, open, entry end of pultrusion die 76. Condenser 70 forms the composite core-precursor mass of fibres and resin to have a cross-sectional configuration which closely approximates that which will be formed for the core in the pultrusion die.

If the particular form of hollow rebar structure which is to be fabricated is to involve "mechanical assistance" in the bonded interface which is to be created between the outside surface of the formed core and the inside surface of the surrounding, hollow sleeve, the optionally employable texturizing peel-ply apparatus in station 72 will come into play at this point in the fabrication process. More specifically, and if this is to happen, a suitable, texturizing, peel-ply strip material, furnished appropriately in several strips, will be drawn in station 72 toward and all around the outside of the precursor core material to travel with this material into peel-ply wrapper 74 which will, effectively, properly wrap this strip material circumferentially around and along the precursor core material for transport along with this precursor material into the pultrusion die.

As was mentioned above, all of the peel-ply apparatus which may optionally be included in apparatus 60, and employed in the fabrication of a rebar structure in accordance with a modified practice of the invention, is entirely conventional in construction and operation. This apparatus, accordingly, may or may not be included as component portions of apparatus 60, and if so included, may be structured therein so that, selectively, a user may employ, or not, the optional peel-ply, texturizing practice of the invention. While different specific, texturizing peel-ply materials may be used for the optional task just described, one product which works especially well for this purpose is sold under the name Econo Ply E peel ply made by Airtech Advanced Materials Group in Huntington Beach, Calif.

The appropriately prepared, precursor core material, with or without applied peel-ply texturizing strip material, now enters pultrusion die 76, wherein it will be formed into a rebar core structure, also referred to herein as a first, fibre-reinforced, curable-plastic-composite-material component. As will be explained, the core-structure formation which occurs in this die, uniquely, is formed so that the core structure that emerges from the die is in a so-called "B-staged" condition, in the sense that the included resin, and particularly the outer surface regions of that resin, preferably, are only about 90% cured. This condition is referred to also in this text as one wherein the core structure possesses included plastic material having an outwardly exposed, less than fully cured, exposed-plastic-material bonding surface. More will be said regarding this B-staged core-resin, and bonding-surface, condition, how it comes about, and why it is important, shortly.

It will be clear that the pultrusion die employed to fabricate the core structure which has been described above herein will be designed to have an internal, central, cross-sectional diameter which essentially matches the intended outside diameter of the described core structure. It will also be clear, with respect to the making of modified forms of a rebar structure according to the fabrication practice of the present invention, and where it is intended that the core structure have different inside and outside diametral dimensions than those which have been described specifically above, that one or both of the various diametral sizes of mandrel 64, and of the just-mentioned inside diameter of the pultrusion die, will be adjusted accordingly.

Preferably, precursor core material entering the pultrusion die, and then traveling centrally along the long axis of that die. first experiences in the die a resin-cooling zone defined by die-surrounding water jacket 78, which, as indicated by a downwardly pointing arrow disposed above it in FIG. 6A, receives a flow of "normal-temperature" tap water. While this resin-cooling practice, and the use and presence of such a cooling-water jacket in the apparatus of the invention, are preferred, we understand that there may be instances wherein this cooling environment may not be employed. Those skilled in the art will be well-armed to make such a decision.

As the core-material mass of e-glass fibers and resin travels through the pultrusion die, which has a length herein of about 3-feet, it is subjected, in sequence, to applied heat in three different heating zones that are defined, respectively, and in a progressive and downstream sense, by heaters 80, 82, 84, respectively. For the throughput transport speed which has been described above herein, and in relation to the rebar core structure specifically described above, the heating-zone temperature produced within the die by heater 80 is preferably about 160° F., that produced by heater 82 is preferably about 170° F., and that produced by heater 84 is preferably about 180° F. For the apparatus operational parameters which have been described so far herein, these nominally preferred pultrusion-die heating zone temperatures may vary by as much as about plus or minus 5° F.

As has been mentioned above herein, one of the important features of the present invention, with respect to the fabrication of the central core structure, is that this structure, where it emerges from the pultrusion die, is B-staged, in the sense that the outer, bonding-surface regions of the resin in this core structure are less than 100%, and specifically about 90%, cured. The importance of this unique feature of the fabrication practice of the invention is that this not-completely-cured, core-structure resin is, by virtue of this not-fully-curing practice, at that point specially prepared, with respect to the above-mentioned, exposed plastic-material bonding surface, to participate in the establishment of an important single-cure, reverse-temperature-gradient-cure, plastic-material molecular bond which will take place in the rotational die respecting circumsurrounding formation of the sleeve structure. While it is certainly possible that some form of modestly appropriate bonding between the core structure and the sleeve structure may take place other than through the B-staging fabrication practice implemented by the apparatus of the present invention which leads to very strong molecular bonding, such a practice is most definitely less preferred.

We have determined that, given the structure of apparatus 60 as so far described, with pultrusion die 76 having the length just mentioned above, and heaters 80, 82, 84 having lengths which are related proportionately approximately as shown in FIG. 6A relative to the stated length of the pultrusion die, and given the throughput travel speed of material which is being processed, and the stated size of the intended core structure, and further given the specific heating-zone temperature levels that have been identified as being furnished by these heaters within the pultrusion die, B-staging to the 90% exit-emergence extent stated above predictably takes place. It is thus the case that, as the formed core structure emerges from the pultrusion die, the outer regions of the resin in this structure specifically have the less-than-100% cured state mentioned.

If texturizing peel-ply strip material has been employed as an option, then, peel-ply stripping apparatus, which is conventionally included in peel-ply stripping station 86, next peels away this strip material from the core structure following the core structure's emergence from the pultrusion die—such stripping activity being illustrated in FIG. 6A by the evident, arrow-headed, dash-double-dot line which extends upwardly at a slight leftwardly inclined angle in this figure from within station 86.

Immediately downstream from where the formed core structure emerges from the pultrusion die, and beyond stripping station 86, the surface of the traveling core structure is engaged by conventional rotary encoder 88 which sends appropriate information to system 106 to inform the system specifically about the then-present actual transport, or travel, speed of material through apparatus 60.

Just immediately beyond the rotary encoder, the formed core structure, B-staged as described, then enters the BMC high-pressure resin-injection system indicated at 90 in FIG. 6B.

Injection system 90, and rotary die 92, function collaboratively in what is referred to herein, and what is conventionally known as, a continuous-transfer-molding manner. Appropriately prepared bulk-molding-compound (BMC) material is supplied via system 90 adjacent the upstream, infeed end of rotational die 92 under very high hydraulic pressure, typically around 400-psi, and is auger force-fed into a surrounding condition relative to the previously prepared core structure which is about to enter die 92 in preparation for formation of the above-discussed sleeve and ridge structure, such as previously described sleeve 34 and ridge structure 36. As has been mentioned, the apparatus which forms system 90 is entirely conventional in construction. The integrated sleeve and ridge structure which is about to be formed in the rotational die is also called herein a second, fibre-reinforced, curable-plastic-composite-material component.

The BMC material, as has also already been mentioned, may take on any one of a number of known mixes, or formulae, well understood by those skilled in the art, with this compound which is to be handled by system 90 definitively including the same (as in the formed core structure), preferred, thermoset resin mentioned above, and an appropriate, blended-in population of chopped carbon fibres at a volumetric level which will produce, in the rotationally formed sleeve and ridge structure, a volumetric occupancy by the carbon fibers in that integrated structure of about 15%.

Precursor sleeve and ridge-structure material, thus injected and forced around the formed core structure, and now entering die 92, is subjected to continuous sleeve-and-ridge-structure forming rotation of the die as indicated by curved arrow 108, with all material advancing through the die at the throughput speed of about 12-inches-per-minute under a circumstance with the central rotational component in die 92 rotating under power at the previously mentioned rate of about 8.3-rpm. As mentioned above, the drive motor which specifically, and conventionally, creates this rotational motion, and which is not illustrated in the drawings, is under the control of control system 106.

With attention, for a moment, directed specifically to FIG. 7, the central, rotational component within die 92 is shown generally at 92a. This generally tubular component has its hollow interior 92b configured appropriately to produce, around the core structure, a sleeve, and integrated, homogeneous, double-wind, helical ridge structure, having the dimensionality described earlier herein for the specific, illustrative hollow rebar structure that has been discussed hereinabove.

Disposed inside of component 92a, and centrally located along the coinciding, long, central axis of this rotational die and rebar formation axis 60a, is mandrel 64 as shown. In the space between the outside of the mandrel and interior 92b in component 92a, one can see in FIG. 7 both the earlier-formed core structure 32, and the now forming sleeve and ridge structures 34, 36.

Turning attention now to the heaters, or heating structure, associated with rotational die 92, these heaters, as will be recalled, include two, external heaters 94, 96, and an internal heater 98 which appears only in FIG. 7 in the drawings. Heaters 94, 96, wrap circumferentially around the rotational die, and create respective, associated heating zones within the die at preferred temperatures therein of about 225° F. and 275° F. respectively. These preferred temperatures, we have determined, for the processing parameters that have been described so far herein, may vary from the levels just stated by about plus or minus 5° F.

In apparatus 60, the pultrusion die has an overall length of about 12-inches, and the respective lengths and dispositions of heaters 94, 96 are generally proportioned and located as illustrated in FIGS. 6B and 7.

Heater 98 resides within the previously mentioned shroud—an elongate, tubular structure designated 98a in FIG. 7. The right end of shroud 98a in this figure is closed by previously mentioned end plug 64a. Power-supply and heating-control wiring for energizing heater 98 is shown at 98b in FIG. 7, and is routed to the heater through the closed left end of the shroud, and from the upstream, open end of mandrel 64, and through the mandrel. The earlier-mentioned, system-106 control connection which is provided for, and to, internal heater 98 is through wiring 98b.

Internal heater 98 is one of the very unique contributions of the present invention in that it cooperates in a very special way with heaters 94, 96 to cure, nearly to completion, all of the plastic resin material which is moving both in the core structure and in the sleeve and ridge structures through the rotational die. Very specifically, heater 98 produces what is referred to herein as a reverse temperature gradient which means that the temperature inside mandrel 64, and thus within the central portion of the rotational die, at the location illustrated for heater 98 declines progressing outwardly through the core and sleeve material toward the outside of the rotational die. Heater 98 creates a heat zone in its immediate area within mandrel 64 at the level preferably of about 300° F., with a permitted variation, as far as we are now able to determine, satisfactorily lying within about plus or minus 5° F.

This reverse temperature gradient works specially upon the interfacial, compatible (same), thermoset, plastic resin material which exists in the contacting, interfacial regions of the core structure and the sleeve structure near heater 98, and recalling that the B-staged condition of the outer region of the thermoset plastic material in the core exists within the rotational die, this gradient causes what is also referred to herein as a single-cure, plastic-material, molecular bond to take place—"single-cure" in the sense that curing takes place simultaneously and in a single "action" for plastic material included in the core structure and in the interior of the adjacent sleeve structure. The interfacial zone between the core and the main body of the sleeve where this single-cure activity takes place is referred to herein also as a region wherein the yet-uncured plastic material which is included in the sleeve lies in contact with the exposed, less than fully cured bonding surface mentioned above in the B-staged plastic core material. It is the special molecular bond, so produced during single-stage curing, which results in an extremely strong and robust bonded connection between the sleeve and core structures—a bond which plays a very important role in the manners described earlier herein in which load handling is performed by hollow rebar structure made by the apparatus of the present invention.

Such a bond may be enhanced in a mechanical fashion under circumstances where surface texturing, using the described peel-ply strip material, is employed in the apparatus to create a roughened surface on the outside of the precursor core material as that material prepares to enter the region of the rotational die.

Substantially completed rebar structure which emerges from the rotational die enters downstream-located oven 100 which, under the fabrication conditions that have just been described, is maintained at a temperature of around 280° F. Resin curing finishes in this oven.

Figure 8:
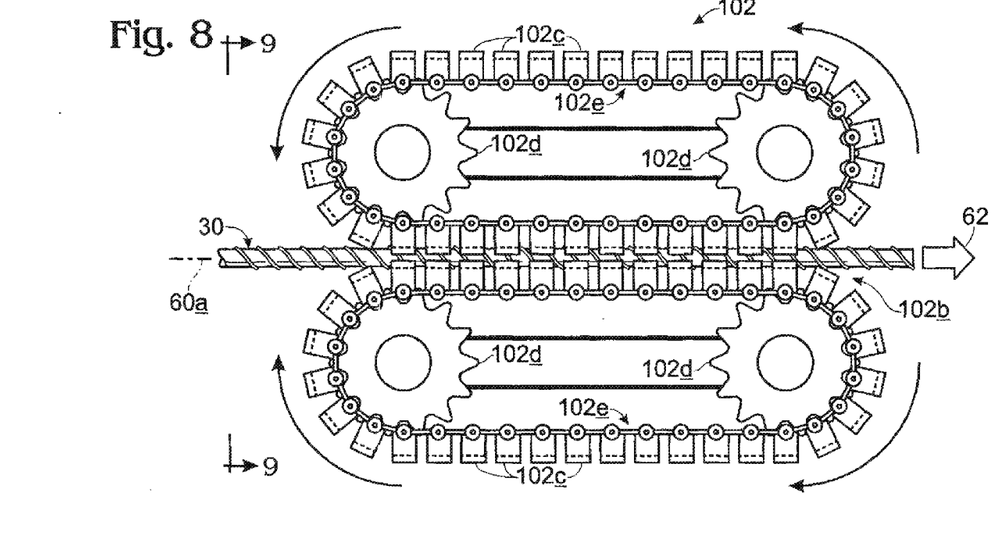
FIG. 8, which is drawn on a somewhat smaller scale than that employed in FIG. 7, presents a fragmentary side-elevation of a "crawler-tractor-style" puller which is included in the apparatus of FIGS. 6A, 6B.
Figure 9:
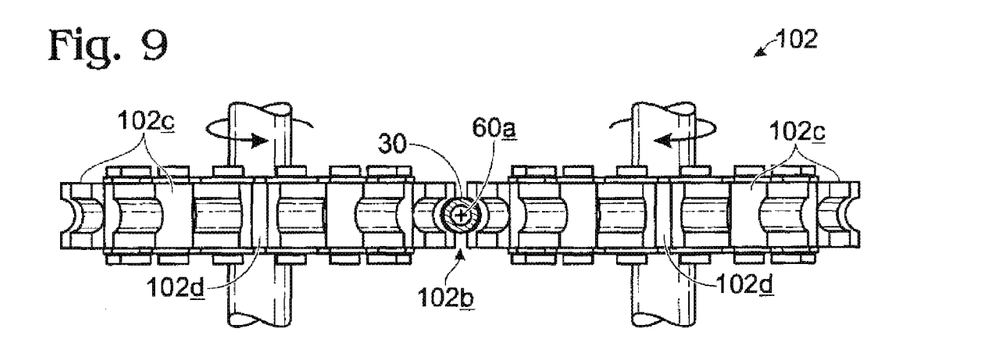
FIG. 9, presented on about the same scale used in FIG. 8, is a fragmentary view, rotated 90-degrees counterclockwise, taken generally along the line 9-9 in FIG. 8.

Downstream in apparatus 60 from oven 100, puller 102, which is spaced from the discharge end of the rotational die by a distance of about 60-inches operates to maintain and pull the traveling rebar materials throughout all processing in the apparatus. This puller which, as has been mentioned, and as can be seen in FIGS. 6B, 8 and 9 in the drawings, is a crawler-tread-, or caterpillar-, style puller, exerts a substantial grip in the long, opposed-grip, nip region 102b presented between high-frictioning, urethane tread blocks, or cleats, such as those shown at 102c, that are mounted on sprocket (102d)-supported, endless track bands, such as track band 102e, to exert a positive, rotation-resisting, pulling purchase on the traveling rebar structure. Importantly, the puller is constructed to resist any tendency of the forming rebar structure to rotate under the rotational influence of die 92. Additionally, puller 102 is positioned relatively close (60-inches, as mentioned above, is close enough) to the discharge end of die 92 to minimize torque twisting of emerging rebar.

Downstream from puller 102, chop saw 104, moving, when instructed under the control of system 106, and the resulting controlling influence of motor instrumentality 104b, along rail structure 104a, and in readiness to perform what may be called a "relatively stationary" rebar crosscut, follows exactly, and for a relevant, short distance, the downstream apparatus-transport-speed motion and direction of the emerging and completed rebar structure. Activated, at the appropriate moment, by system 106 while so moving, it produces such a crosscut, thereby cutting free a final rebar product of a selected length. The "relatively stationary" concept simply means that, with the chop saw moving as described, in readiness for, and during, the making of a rebar crosscut, there is no relative travel motion between it and the adjacent rebar. Between crosscuts, the chop saw is moved upstream in preparation for the nest crosscut "instructions".

Accordingly, the composite-material, hollow-rebar-making apparatus proposed by the present invention, just described in detail, includes a special combination of fabrication components particularly featuring (1) a core-forming pultrusion die which collaborates with heating structure to create formed, emerging core structure whose included, emerging plastic resin material is in a 90% B-staged condition, (2) a downstream rotational transfer-molding die which forms, around the outside of the core structure, a hollow sleeve that carries integrally formed, outside, radially projecting, helical winds, and which collaborates with heating structure including a unique internal heater that effects a reverse temperature gradient to promote a specialized, single-cure plastic-resin-material molecular bond in the interface uniting the core and sleeve structure, and (3) a specialized, anti-rotation crawler-tread-type downstream puller which, while resisting all rotation of rebar structure being fabricated as potentially influenced by operation of the rotational die, firmly pulls the fabrication material steadily through the apparatus during the fabrication process.

Other componentry which is included in the overall fabrication apparatus of the invention cooperates with these several particular components to produce a hollow rebar structure as described herein.

From the description just given of apparatus 60, it should be apparent how this apparatus implements the earlier described fabrication methodology which includes, according to one manner of expressing it, the steps of (1) forming, in a pultrusion die, an elongate, composite-material, fiber-reinforced curable-plastic-material-including, hollow core, (2) applying heat within the pultrusion die to create, for the core's included plastic material as it emerges from the die, an outer-surface plastic condition which is less than 100% cured, (3) in association with, and downstream from, the core-forming step, preparing, in a rotational, continuous-transfer-molding die, on the less-than-100%-cured outer-bondind-surface plastic of the core, and along the core's length, an elongate, hollow, composite-material, fiber-reinforced, curable-plastic-material-including, core-circumsurrounding sleeve, (4) in relation to the preparing step, and within the transfer-molding die, creating unitarily with the sleeve, and in a manner distributed along the length of the sleeve's outer surface, an external-purchase-enhancing structure possessing radial-dimensionality, and (5), within the transfer-molding die, applying heat to effect between the plastic material in the core and that in the sleeve both a single-cure, and a reverse-temperature-gradient-cure, plastic-material molecular bond.

As an important sub-aspect of this just-described, apparatus-60-implemented, fabrication methodology, the proposed methodology also involves what we refer to as stage-creating, and then joining, first and second, fiber-reinforced, curable-plastic-composite-material components, including the steps of (1) forming the first component to a condition wherein it possesses, respecting its included plastic material, an outwardly exposed, less than fully cured, exposed-plastic-material bonding surface, (2) forming, on this less than fully cured bonding surface in the first component, the second component, and doing so in a manner whereby the second component possesses, respecting its included plastic material, a yet-uncured, exposed-plastic-material bonding surface which is in contact with the less than fully cured bonding surface in the first component, and (3) in a heat-applying, cure-simultaneity procedure, effecting between the first and second components a single-cure, molecular bond. Componentry in the fabrication apparatus of the invention uniquely accommodates this methodologic practice.

Accordingly, the apparatus of the present invention, and the setting within which it is designed to operate, have been fully illustrated and described, with possible modifications mentioned. Notwithstanding this, we appreciate that other variations and modifications may be perceived and made by those skilled in the art, and it is our intention that all such other variations and modifications will be understood to be within the spirit of the invention and covered by the following claims.

We claim:

1. Apparatus for making an elongate, composite-material, hollow rebar structure, said apparatus having a long, rebar-formation axis, and upstream and downstream regions disposed at spaced locations on and along said axis, said apparatus, progressing therein, and therealong, from said upstream region toward said downstream region, comprising an elongate, hollow mandrel having a long axis which is substantially coincident with said rebar-formation axis, extending from adjacent said upstream region toward adjacent said downstream region, an elongate, hollow pultrusion die disposed operatively adjacent said upstream region, having a long axis which is substantially coincident with said rebar-formation axis, circumsurrounding said mandrel, and operable to form an elongate, composite-material, hollow core in the region disposed between itself and said mandrel, and an elongate, hollow, continuous-transfer-molding die disposed downstream, and spaced, from said pultrusion die, having a long axis about which it is rotatable and which is substantially coincident with said rebar-formation axis, said transfer-molding die being operable to form, along the length of a core which has been formed upstream by said pultrusion die, (a) an elongate, composite-material, core-circumsurrounding, hollow sleeve having an outer surface, and (b), unitarily with the sleeve, and in a manner distributed along the length of the sleeve's outer surface, an external-purchase-enhancing structure possessing radial-dimensionality.

2. The apparatus of claim 1 which further comprises plural heaters distributed in spaced relation with respect to one another along said rebar-formation axis, disposed in operative adjacency relative to, and association with, said dies.

3. The apparatus of claim 2 which further comprises a power-driven puller disposed downstream along said rebar-formation axis in spaced relation to said transfer-molding die, operable to pull a forming rebar through the dies in a downstream direction along the rebar-formation axis.

4. The apparatus of claim 3 which further comprises a drive motor drivingly connected to said puller, operable to drive the puller at a speed which moves a forming rebar along said rebar-formation axis at a rate relative to said pultrusion die and to the heaters which are operatively associated with that die whereby the outer surface of plastic material in core structure emerging downstream out of the pultrusion die, and later entering the transfer-molding die, is, and remains during transit between the dies, in a less-then-100% cured condition.

5. The apparatus of claim 4, wherein said plural heaters include heating structure disposed both inside said transfer-molding die and within said hollow mandrel where it extends through that die, operable to produce a reverse, radially outwardly directed relative to said rebar-formation axis, heat gradient.

* * * * *